United States Patent [19]
Parry

[11] Patent Number: 5,297,717
[45] Date of Patent: Mar. 29, 1994

[54] SELF-ALIGNING TIP ELEMENTS FOR TWEEZER-TYPE SOLDERING HANDPIECE

[75] Inventor: Corey A. Parry, Laguna Niguel, Calif.

[73] Assignee: Pace Incorporated, Laurel, Md.

[21] Appl. No.: 43,458

[22] Filed: Apr. 5, 1993

[51] Int. Cl.⁵ .............................................. B23K 3/02
[52] U.S. Cl. ........................................ 228/55; 228/51; 219/230
[58] Field of Search .................... 228/51, 55, 44.7, 19, 228/20.5; 219/229, 230; 156/380.6; 29/758, 764

[56] References Cited

U.S. PATENT DOCUMENTS

| | | | |
|---|---|---|---|
| 3,804,320 | 4/1974 | Vandermark | 228/51 |
| 4,034,202 | 7/1977 | Vandermark | 228/51 |
| 4,828,162 | 5/1989 | Donner et al. | 228/51 |
| 5,145,101 | 9/1992 | Brown et al. | 228/51 |

Primary Examiner—Samuel M. Heinrich
Attorney, Agent, or Firm—Sixbey, Friedman, Leedom & Ferguson

[57] ABSTRACT

Self-aligning tip elements are achieved in accordance with preferred embodiments of the invention by providing a edge surface of each tip element with key and notch formations which will interfit with each other in a prescribed orientation when the tip elements are inserted into the bobbins of the a tweezer handpiece and the tip elements are brought together by squeezing-together the legs of the tweezer handpiece. By utilizing a symmetric arrangement of key and notch formations on each tip element, a pair of like tip elements can be used together instead of requiring special left and right tip elements.

16 Claims, 2 Drawing Sheets

SELF-ALIGNING TIP ELEMENTS FOR TWEEZER-TYPE SOLDERING HANDPIECE

BACKGROUND OF THE INVENTION

1. Field of the Invention

The present invention relates to tip elements of the type used with tweezer-type soldering handpieces to reflow solder, via conductive heat transfer, to effect the installation and removal of electronic components with respect to a substrate.

2. Description of Related Art

U.S. Pat. No. 5,145,101 describes a tweezer handpiece for the installation and removal of electronic components with respect to a substrate and tip elements for use therewith. This patent also discloses a tool for use in aligning pairs of tip elements which have multiple heating surfaces in bobbin units of the handpiece before they are secured in place, so that the heating surfaces of the tip elements will be properly aligned axially, transversely and rotationally. In addition to the simple fact that such an alignment tool is necessary, with the inherent extra cost and possibility for the tool to become lost or misplaced, the need to use such a tool can prove inconvenient and requires extra care to be used when reinstalling tips which have been previously used and have a quantity of solder that solidified after the tip element was removed from the heating handpiece. That is, when replacing such used tip elements, they cannot be closed on the alignment tool until the mass reflows, and at this point the handpiece must be held oriented vertically upward to keep the tool in place between the tip elements while the screws on the bobbins are tightened. However, if held vertically when the solder remelts, it can spill down onto the hand of the user if care is not taken to shake the molten solder from the tip elements before inserting the tool. Thus, it would be advantageous if the need for the alignment tool could be eliminated.

SUMMARY OF THE INVENTION

In view of the foregoing, it is the primary object of the present invention to provide tip elements for a tweezer handpiece for the installation and removal of electronic components with respect to a substrate which are self-aligning.

In furtherance of the preceding object, it is a further object to achieve a pair of tip elements which will be self-aligning without having to be manufactured in pairs.

These and other objects of the present invention are achieved in accordance with preferred embodiments of the invention by providing a edge surface of each tip element with key and notch formations which will interfit with each other in a prescribed orientation when the tip elements are inserted into the bobbins of the a tweezer handpiece and the tip elements are brought together by squeezing-together the legs of the tweezer handpiece. By utilizing a symmetric arrangement of key and notch formations on each tip element, a pair of like tip elements can be used together instead of requiring special left and right tip elements.

These and further objects, features and advantages of the present invention will become apparent from the following description when taken in connection with the accompanying drawings which, for purposes of illustration only, show several embodiments in accordance with the present invention.

BRIEF DESCRIPTION OF THE PREFERRED EMBODIMENTS

DETAILED DESCRIPTION OF THE PREFERRED EMBODIMENTS

Figure 1:
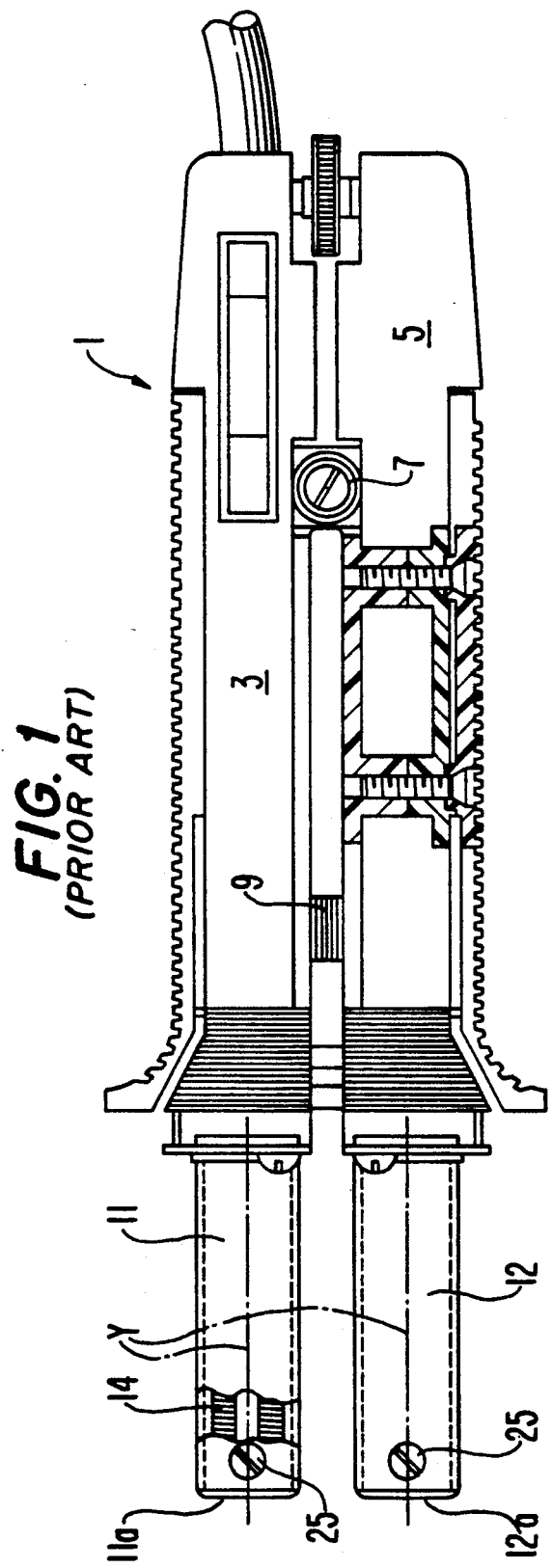
FIG. 1 is a partially broken-away side view of a prior art tweezer handpiece of the type with which tip elements of the present invention are usable.

FIG. 1 shows a handpiece 1 of a handheld, tweezer-like tool which, together with a variety of tip elements (both of which are shown and described in detail in the above-noted U.S. Pat. No. 5,145,101, said patent being hereby incorporated by reference) forms a conductive heating device via which electronic components may be installed and removed from a substrate by producing a solder reflow, especially for surface mount component (SMC) removal. Handpiece 1 has a pair of legs 3, 5 that are pivotally connected via a hinge 7, and upon which a spring 9 acts to spread the legs 3, 5 apart. Additionally, at the free end of each leg 3, 5 a heating bobbin unit 11, 12 is mounted, and within which an electrical resistance heating element 14 is coiled.

Figure 2:
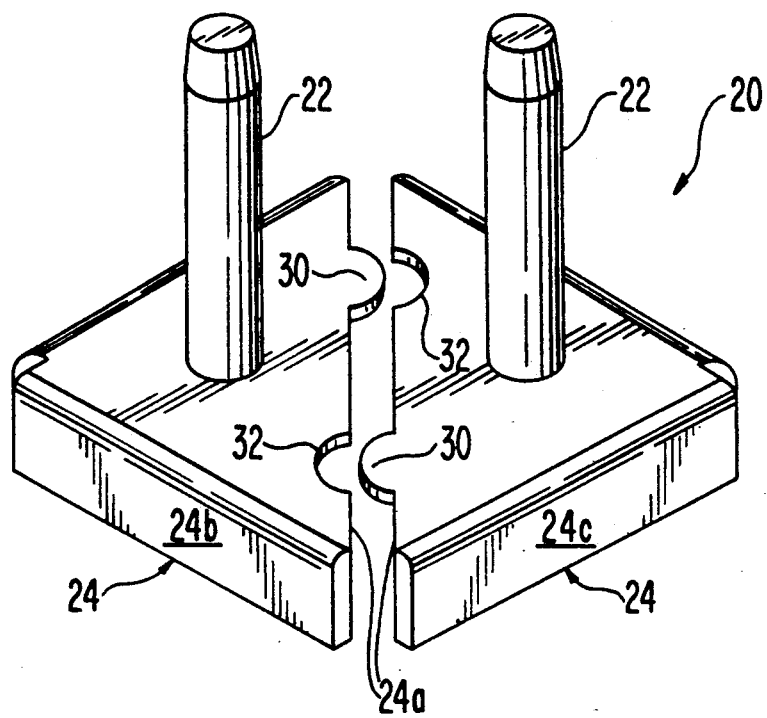
FIG. 2 is a bottom perspective view of a pair of tip elements in accordance with the present invention.
Figure 3:
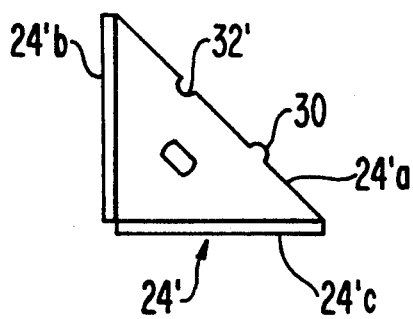
FIGS. 3 and 4 are top and side views of a modified tip of a tip element in accordance with the present invention.
Figure 4:
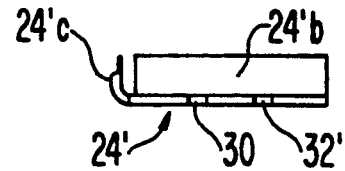

As with the prior tip elements for use with the above-described patented handpiece 1, the tip elements 20 of the present invention (FIG. 2–4) have an attachment pin portion 22 and a conductive heating element tip portion 24, 24' which is affixed on an end of the attachment pin portion 22. The attachment pin portion 22 of each of a pair of tip elements, in use, is inserted through an opening in end face 11a, 12a of the bobbin units 11, 12 until they bottom out on these end faces (this bottoming-out being producible by gravitational effects with the handpiece held vertically, or by pressing of the tips against any flat surface). However, before the pair of tip elements 20 can be secured in place in the bobbin units 11, 12, via set screws 25, they must be properly aligned with respect to each other. For example, in the case of a pair of tips 20 which, when brought together, form a rectangle or square, the tip portions 24, 24' must be aligned transversely, i.e., in directions parallel to edge faces 24a, 24'a in view of the play between the pin portions 22 and the bobbin units 11, 12, and rotationally relative to the axis of pin portions 22 to insure that the upstanding heating surfaces 24b, 24'b and 24c, 24'c of one of the pair of tip elements 20 are parallel to the respective heating surfaces of the other tip element of the pair.

As pointed out initially, with the corresponding tip elements disclosed in the above-noted U.S. Pat. No. 5,145,101, a separate alignment tool was require to transversely and rotationally align them. However, in accordance with the present invention, such a tool is unnecessary due to the provision of self-aligning key and notch formations 30, 32 or 32' which will interfit with each other in a prescribed orientation when the tip elements are inserted into the bobbin units 11, 12 of the tweezer handpiece 1 and the tip elements 20, 20' are brought together by squeezing-together the legs 3, 5 of the tweezer handpiece 1. By utilizing a symmetric arrangement of the key and notch formations 30, 32 or 32' on each tip element 20, a pair of like tip elements 20 can be used together instead of requiring special left and right tip elements. In this regard, the keys 30 can be matched to the notches, as is the case for the rounded, e.g., semi-circular keys 30 and notches 32 of FIG. 2, or they may merely be complementarily shaped in a way which allows the keys to seat within the notches with multiple points of contact between them, as is the case for the rounded keys 30 and V-shaped notches 32' of FIGS. 3 and 4. In fact, the use of unmatched, complementarily shaped key and notch formations is preferred because such arrangements do not require the degree of precision which is necessary when matching shapes are used. Of course, it should be realized that other shapes beyond those illustrated may be used so long as they act, when interengaged, to bring the tip portions 24, 24' into proper transverse and rotation relationship with respect to each other.

While various embodiments in accordance with the present invention have been shown and described, it is understood that the invention is not limited thereto, and is susceptible of numerous changes and modifications as known to those skilled in the art. Therefore, it is not intended for this invention to be limited to the details shown and described herein, and it is, instead, intended to cover all such changes and modifications as are encompassed by the scope of the appended claims.

I claim:

1. A self-aligning tip element for a tweezer handpiece of a soldering tool of the type having a pair of legs which are hinged together and have a mounting unit at a free end of each leg, comprising an attachment pin portion for insertion into the mounting unit of each leg of a tweezer handpiece, and a conductive heating element tip portion which is affixed on an end of the attachment pin portion, said conductive heating element tip portion having an attachment part secured to an end of the attachment pin portion in an orthogonal orientation with respect thereto, and having a plurality of upstanding heating surfaces extending outward from said attachment part and which, when aligned relative to heating surfaces of a second tip element, correspond in size and shape to a component to be soldered; wherein, as a means for transversely and rotationally aligning the tip element with respect to a second tip element when said tip elements are inserted into the mounting units of the tweezer handpiece and the tip elements are brought together by squeezing-together the legs of the tweezer handpiece, an edge surface of the attachment part of the tip element is provided with key and notch formations which will interfit with key and notch formations of the second tip element in a prescribed orientation when the tip elements are brought together.

2. Tip element according to claim 1, wherein the key and notch formations are symmetrically arranged on the tip element in a manner enabling a pair of like tip elements to be used together as right and left tip elements.

3. Tip element according to claim 2, wherein the key and notch formations are shaped in a manner causing the key to seat within the notch with multiple points of contact between them.

4. Tip element according to claim 3, wherein the key and notch formations have different complementary shapes.

5. Tip element according to claim 4, wherein the different complementary shapes of the key and notch formations comprise a V-shaped notch and a rounded key.

6. Tip element according to claim 3, wherein the key and notch formations have matching shapes.

7. Tip element according to claim 6, wherein the matching shapes of the key and notch formations are rounded.

8. Tip element according to claim 6, wherein the matching shapes of the key and notch formations are circle segments.

9. A soldering tool of the type having a tweezer handpiece of with a pair of legs which are hinged together and a mounting unit at a free end of each leg, and a pair tip elements comprising an attachment pin portion for insertion into the mounting unit of each leg of the tweezer handpiece and a conductive heating element tip portion which is affixed on an end of the attachment pin portion, said conductive heating element tip portion having an attachment part secured to an end of the attachment pin portion in an orthogonal orientation with respect thereto, and having a plurality of upstanding heating surfaces extending outward from said attachment part and which, when aligned relative to the heating surfaces of a second one of the tip elements, correspond in size and shape to a component to be soldered; wherein, as a means for transversely and rotationally aligning the tip elements with respect to each when said tip elements are inserted into the mounting units of the tweezer handpiece and the tip elements are brought together by squeezing-together the legs of the tweezer handpiece, an edge surface of the attachment part of the tip elements is provided with key and notch formations which will interfit with key and notch formations of the second tip element in a prescribed orientation when the tip elements are brought together.

10. Tip element according to claim 9, wherein the key and notch formations are symmetrically arranged on the tip element in a manner enabling a pair of like tip elements to be used together as right and left tip elements.

11. Tip element according to claim 10, wherein the key and notch formations are shaped in a manner causing the key to seat within the notch with multiple points of contact between them.

12. Tip element according to claim 11, wherein the key and notch formations have different complementary shapes.

13. Tip element according to claim 12, wherein the different complementary shapes of the key and notch formations comprise a V-shaped notch and a rounded key.

14. Tip element according to claim 11, wherein the key and notch formations have matching shapes.

15. Tip element according to claim 14, wherein the matching shapes of the key and notch formations are rounded.

16. Tip element according to claim 14, wherein the matching shapes of the key and notch formations are circle segments.

* * * * *